US005590416A

United States Patent [19]

Rydbeck

[11] Patent Number: 5,590,416

[45] Date of Patent: Dec. 31, 1996

[54] CANTED ANTENNA FOR A CELLULAR RADIOTELEPHONE

[75] Inventor: Nils R. Rydbeck, Cary, N.C.

[73] Assignee: Ericsson Inc., Research Triangle Park, N.C.

[21] Appl. No.: 401,024

[22] Filed: Jun. 8, 1995

[51] Int. Cl.[6] .............................. H04B 1/38; H01Q 1/12

[52] U.S. Cl. .............................. 455/90; 455/89; 455/129; 343/702; 343/882

[58] Field of Search .............................. 455/89, 90, 129; 343/702, 878, 882

[56] References Cited

U.S. PATENT DOCUMENTS

| | | | |
|---|---|---|---|
| 2,563,540 | 8/1951 | Ludwig et al. | 174/153 |
| 2,755,330 | 7/1956 | Ludwig et al. | 174/74 |
| 3,134,847 | 5/1964 | Goldstein | 174/153 |
| 3,407,404 | 10/1968 | Cook et al. | 343/765 |
| 4,628,323 | 12/1986 | Crean | 343/765 |
| 4,868,576 | 9/1989 | Johnson, Jr. | 343/702 |
| 5,204,687 | 4/1993 | Elliott et al. | 343/702 |
| 5,336,896 | 8/1994 | Katz | 455/90 X |

FOREIGN PATENT DOCUMENTS

| | | | |
|---|---|---|---|
| 0508299 | 10/1992 | European Pat. Off. . | |
| 0589450A1 | 3/1994 | European Pat. Off. | H01Q 1/08 |
| 0603012 | 6/1994 | European Pat. Off. . | |
| 0903012A1 | 6/1994 | European Pat. Off. | H04B 1/38 |
| 0694985A1 | 1/1996 | European Pat. Off. | H01Q 1/24 |
| 2702324 | 3/1993 | France . | |
| 57-72402 | 5/1982 | Japan . | |
| 3256920 | 11/1991 | Japan | B65G 47/78 |
| 2070392A | 9/1981 | United Kingdom | H04B 1/38 |

*Primary Examiner*—Chi H. Pham
*Attorney, Agent, or Firm*—David C. Hall

[57] ABSTRACT

A cellular radiotelephone includes an antenna that is moveable between a first position and a second position. In the first position, the antenna is substantially parallel to the face of the radiotelephone thereby reducing the profile of the radiotelephone. Accordingly, the radiotelephone may be easier to store in a confined space such as a shirt pocket. In the second position, the antenna is canted away from the face of the radiotelephone thereby increasing the distance between the user's head and the antenna during use. Accordingly, the electromagnetic shielding caused by the user's head is reduced.

26 Claims, 3 Drawing Sheets

CANTED ANTENNA FOR A CELLULAR RADIOTELEPHONE

FIELD OF THE INVENTION

This invention relates to the field of cellular radiotelephones and more particularly to antennas for cellular radiotelephones.

BACKGROUND OF THE INVENTION

A conventional cellular radiotelephone has an antenna for transmitting and receiving radio signals to and from a cellular base station. The antenna is typically a half-wave dipole antenna mounted on the exterior of the cellular radiotelephone. In the 800–900 Mhz frequency range, the length of a half-wave dipole is on the order of 80 mm. As the size of cellular radiotelephones has decreased, the antenna has become relatively large with respect to the body of the cellular radiotelephone. The relative size of a conventional half-wave dipole antenna may make a small radiotelephone inconvenient to place in a shirt pocket. The relative size of the antenna may also make the radiotelephone cumbersome to use, and may also result in shielding of the antenna during use by the user's head.

An antenna on a cellular radiotelephone is disclosed in U.S. Pat. No. 4,868,576 to Johnson entitled "Extendable Antenna for Portable Cellular Telephones with Ground Radiator." In this patent, the cellular radiotelephone includes an extendable antenna system. This antenna system may, however, be difficult to implement in a small hand-held radiotelephone because of the internal space required to store the antenna when retracted. Furthermore, this type of antenna may be shielded by the user's head during use.

Another approach has been to provide an antenna on the side of the cellular radiotelephone as in the Ericsson DH-198 radiotelephone, for example. This antenna is located on a side of the radiotelephone and rotates 360 degrees in a plane perpendicular to the face of the telephone. Accordingly, the antenna may be rotated to a downward position for storage, and to an upward position for use. This antenna may, however, suffer from reduced gain when the antenna is in a downward position, and it may not be mechanically durable.

Notwithstanding the above-mentioned antennas, there continues to exist a need in the art for a durable antenna for a cellular radiotelephone which provides convenient storage and use positions as well as consistently high gain.

SUMMARY OF THE INVENTION

It is therefore an object of the present invention to provide an improved antenna for a cellular radiotelephone.

It is another object of the present invention to provide an antenna for a cellular radiotelephone which has reduced electromagnetic shielding.

These and other objects are provided, according to the present invention, by an antenna for a cellular radiotelephone that is moveable between a first position and a second position. In the first position, the antenna is substantially parallel to the face of the radiotelephone thereby reducing the profile of the radiotelephone. Accordingly, the radiotelephone may be easier to store in a confined space such as a shirt pocket. In the second position, the antenna is canted away from the face of the radiotelephone thereby increasing the distance between the user's head and the antenna during use. Accordingly, the electromagnetic shielding caused by the user's head is reduced.

This antenna is particularly adapted for use with miniature hand held cellular radiotelephones which may not have adequate space for a retracting antenna. The antennas used on these miniature radiotelephones are typically on the order of 80 mm making them particularly subject to the effects of electromagnetic shielding when held close to the head of the user. Accordingly, an antenna according to the present invention provides a convenient storage position as well as a more functional operating position.

In one embodiment, the cellular radiotelephone includes a radiotelephone body having a front face and a top edge, and this front face defines an imaginary plane extending therefrom. The antenna extends from the top edge of the radiotelephone and defines a first axis. A first end of the antenna is movably mounted adjacent the top edge. The movable mounting allows the antenna to move between a first position wherein the axis defines a first angular orientation relative to the imaginary plane, and a second position wherein the axis defines a second angular orientation relative to the imaginary plane.

The first angular orientation preferably defines an arrangement of the antenna and the radiotelephone body such that the axis and the imaginary plane are substantially parallel. The second angular orientation preferably defines a an arrangement of the antenna and the radiotelephone body such that the axis and the imaginary plane intersect at an acute angle.

The movable mount is preferably a rotatable mount wherein the antenna rotates about a second axis which intersects the first end of the antenna adjacent the top edge of the radiotelephone body. Accordingly, the rotatable mount can be implemented as a boss which receives the first end of the antenna. The boss has an angled surface defining a second imaginary plane extending therefrom and intersecting the first imaginary plane at a non-orthogonal angle. The end surface is rotatably connected to the angled surface, and this rotatable connection is preferably made by a pin. Accordingly, the moveable antenna can be implemented with a relatively simple and robust mounting.

Stated in other words, the antenna may extend from an edge of the radiotelephone body, and the edge defines an imaginary plane. The antenna defines an axis and the antenna has a first end adjacent the edge. In this embodiment, the antenna is movably mounted on the edge such that the antenna is moveable between a first position wherein the axis defines a first angular orientation relative to the imaginary plane, and a second position wherein the axis defines a second angular orientation relative to the imaginary plane.

The first angular orientation preferably defines an arrangement of the antenna and the radiotelephone body such that the axis is substantially perpendicular to the imaginary plane. The second angular orientation preferably defines an arrangement of the antenna and the radiotelephone body such that the axis intersects the imaginary plane at a non-orthogonal angle.

The antenna may rotate about a second axis intersecting the first end, the antenna rotating between the first position and the second position. In order to rotate, the mounting means may comprise a boss for receiving the first end of the antenna. This boss may have an angled surface defining a second imaginary plane extending therefrom and intersecting the first imaginary plane at a non-orthogonal angle. The first end of the antenna may have an end surface defining a third imaginary plane intersecting the axis at a non-orthogonal angle, wherein the end surface is rotatably connected to said angled surface. The mounting means preferably comprises a pin for rotatable connecting the end surface to the angled surface. In addition, the non-orthogonal surface may be on the order of 80 degrees.

Accordingly, the antenna of the present invention can be moved between a first storage position and a second operating position. The first storage position reduces the profile of the radiotelephone thereby allowing the phone to be stored in a small space such as a shirt pocket. In the second operating position, the antenna is canted away from the head of the user thereby reducing electromagnetic shielding.

DETAILED DESCRIPTION OF A PREFERRED EMBODIMENT

The present invention will now be described more fully hereinafter with reference to the accompanying drawings, in which a preferred embodiment of the invention is shown. This invention may, however, be embodied in many different forms and should not be construed as limited to the embodiment set forth herein; rather, this embodiment is provided so that this disclosure will be thorough and complete, and will fully convey the scope of the invention to those skilled in the art. Like numbers refer to like elements throughout.

Figure 1:
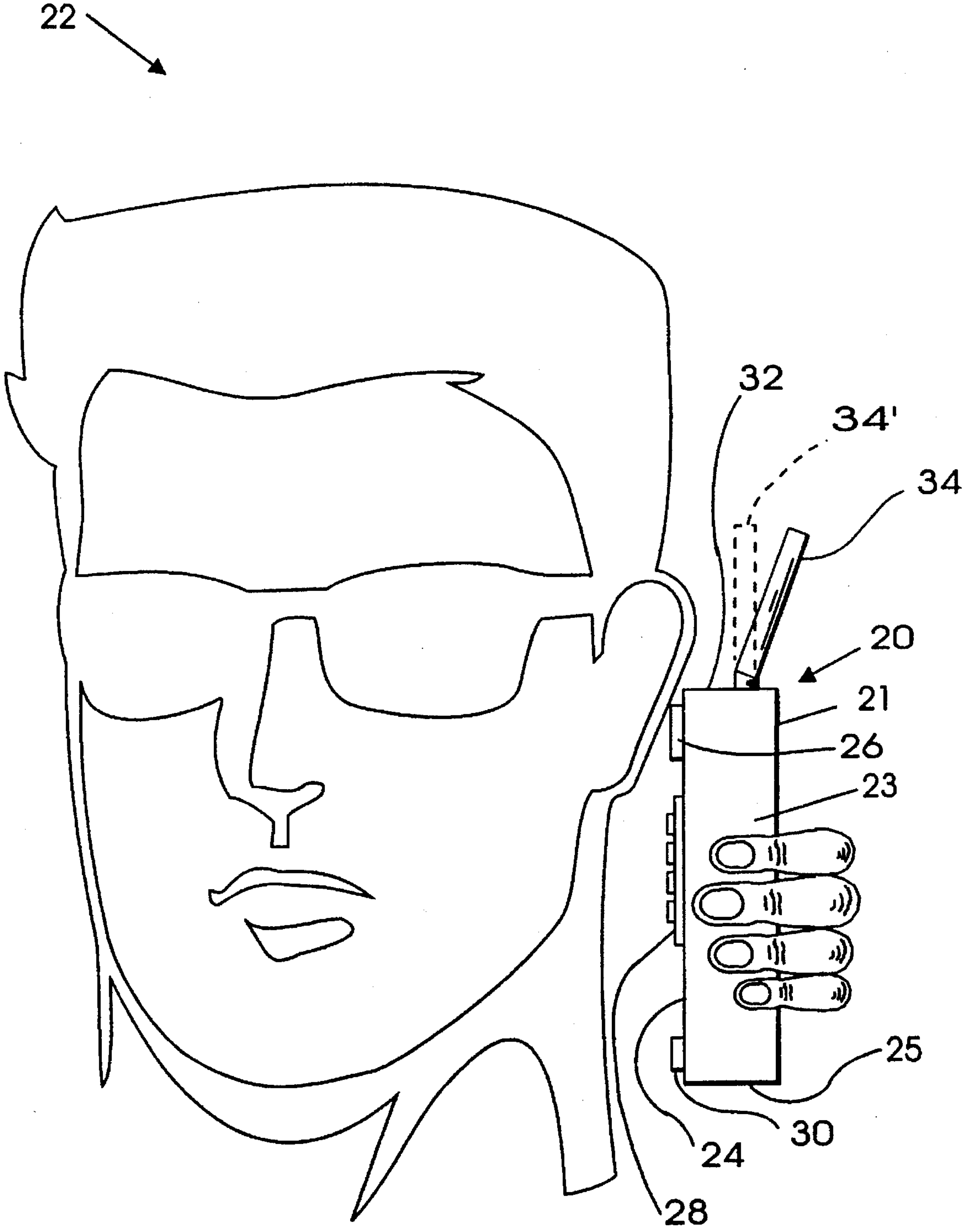
FIG. 1 is a view of a cellular radiotelephone according to the present invention positioned against a user's head.

A hand held cellular radiotelephone 20 is held close to the user's head 22 when talking, as shown in FIG. 1. The cellular radiotelephone has a body including a front face 24 which is held adjacent the user's head when talking. This front face typically includes a speaker 26, a keypad 28, and a microphone 30. The radiotelephone body also includes a top edge 32 on which the antenna 34 is preferably mounted. The speaker 26 is preferably positioned on the front face 24 adjacent this top edge 32. Although shown as elevated for ease of illustration, the speaker 26, keypad 28 and microphone 30 are typically flush with the front face 24 of the radiotelephone.

In addition, the radiotelephone body typically includes a back face 21, a left side edge 23, a right side edge (not shown), and a bottom edge 25. The back face 21 opposes the front face 24. The two side edges oppose one another, and each of these edges is positioned adjacent a long dimension of the faces. The bottom edge 25 opposes the top edge 32, and each of these edges is positioned adjacent a short dimension of the faces.

The radiotelephone 20 also includes a transceiver (not shown) for transmitting and receiving radio signals to and from a base station which is a part of a cellular service system. Accordingly, the user can communicate with another person using either another cellular radiotelephone or a conventional telephone connected to land-lines.

Because the radiotelephone 20 is held close to the head 22 during use, the antenna may be electromagnetically shielded to some degree. Accordingly, the antenna 34 is preferably canted away from the user's head when in use. This orientation of the antenna 34 is shown with solid lines, and reduces the shielding of radio waves by the head.

The canted orientation of the antenna 34 may, however, make the telephone more cumbersome to carry or store when not in use. Accordingly, the antenna can be repositioned so that it is substantially parallel to the face 24 of the radiotelephone. This orientation of the antenna 34' is illustrated in dotted lines.

This two position antenna is achieved by using a moveable mounting means to mount the antenna on the radiotelephone, and this moveable mounting means can be rotatable. Accordingly, the antenna is moveable between a first position (shown as antenna 34' in dotted lines) and a second position (shown as antenna 34 in solid lines). The antenna can also assume intermediate positions between the first and second positions.

Figure 2:
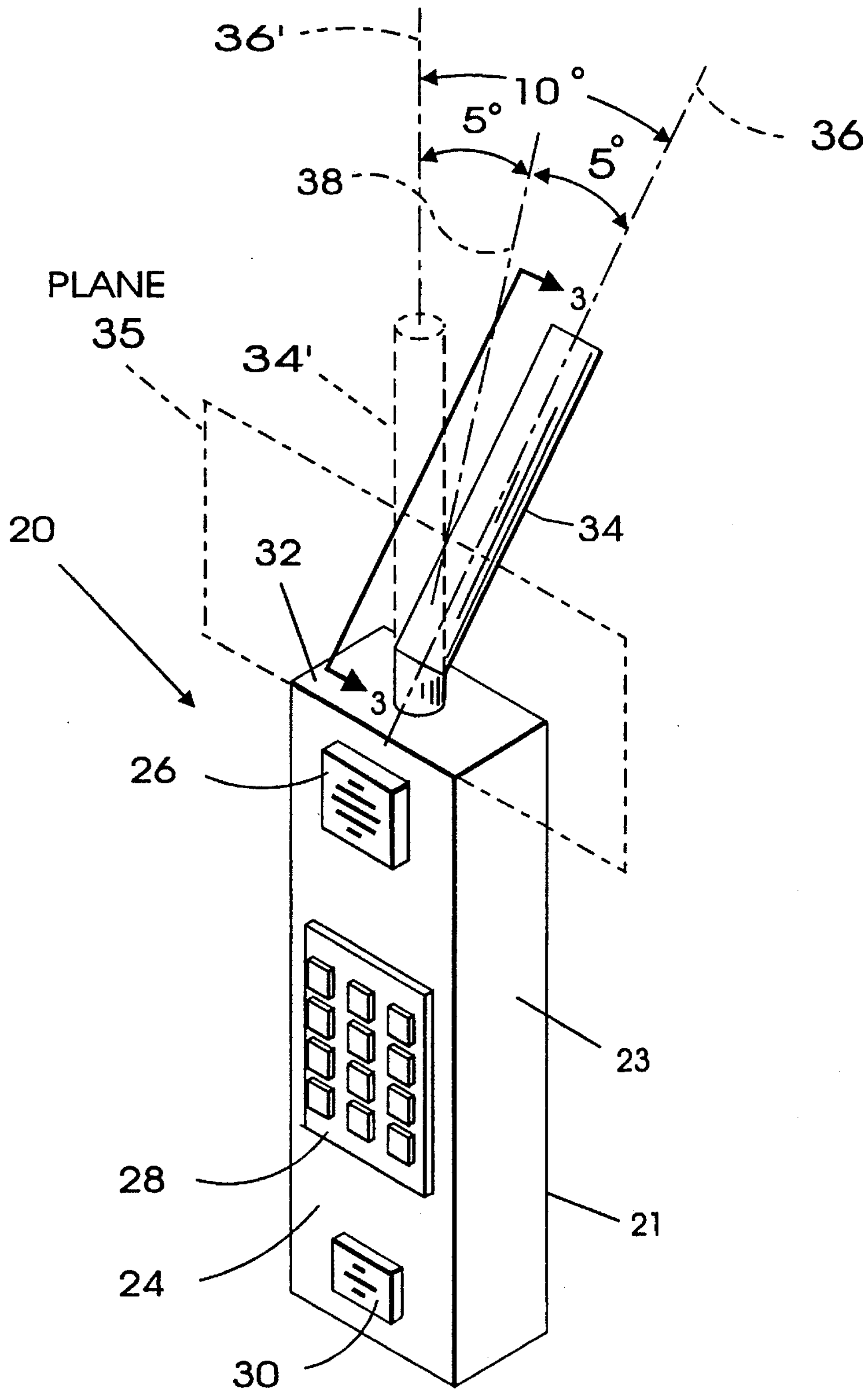
FIG. 2 is an enlarged perspective view of a cellular radiotelephone according to FIG. 1.

The antenna 34 (and 34') defines an axis 36 (and 36') which extends therefrom. Accordingly, when the antenna 34' is in the first position, the axis 36' is substantially parallel to an imaginary plane 35 defined by the front face and extending therefrom thereby making the radiotelephone more convenient to store, as shown in FIG. 2. Alternately, when the antenna 34 is in the second position it is canted away from the front face 24. In this position, the axis 36 intersects the imaginary plane defined by the front face 24 at an acute angle and extends away from the user.

Figure 3:
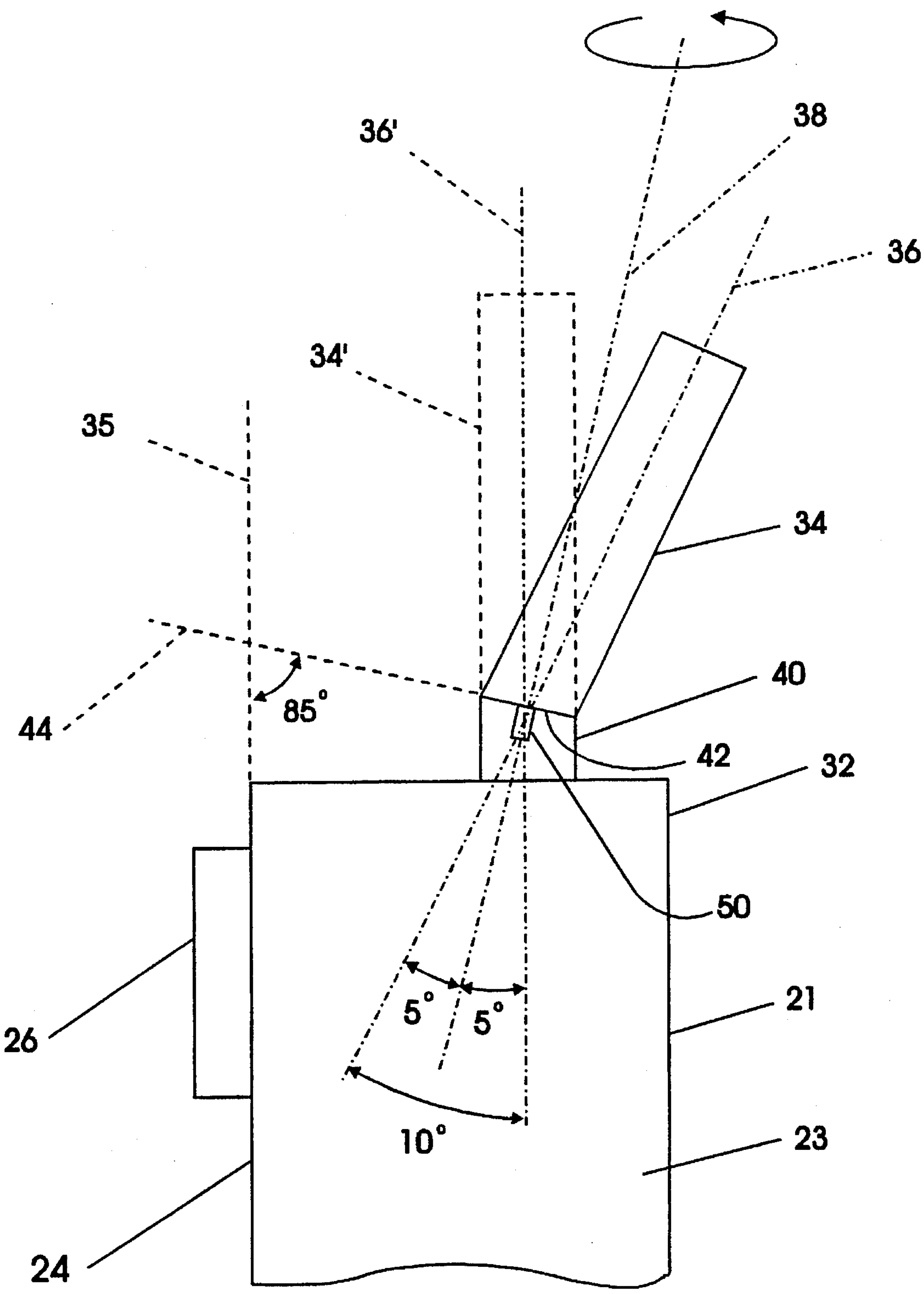
FIG. 3 is a greatly enlarged cross-sectional view of the antenna and upper portion of the radiotelephone body taken along section line 3 of FIG. 2.

The antenna preferably moves between the first position and the second position by rotating about the rotation axis 38 that intersects a first end of the antenna 34 (and 34') adjacent the radiotelephone, at an angle perpendicular to the end surface of the antenna 34 and to the angled surface 42 of the boss 40. This rotation is preferably accomplished by mounting the first end of the antenna on a boss 40 having an angled surface 42, as shown in FIG. 3. The angled surface 42 defines an imaginary plane 44 extending therefrom, and this plane 44 intersects an imaginary plane 35 extending from the front face 24 at a non-orthogonal angle. Alternately, the imaginary plane 44 defined by the angled surface 42 can be viewed as intersecting an imaginary plane defined by the top edge 32 of the radiotelephone body. The first end of the antenna has an end surface defining an imaginary plane which intersects the axis 36 at a non-orthogonal angle, and this end surface is rotatably connected to the angled surface 42 of the boss 40.

In a preferred embodiment, the non-orthogonal angle between the imaginary plane 35 defined by the front face 24 and the imaginary plane 44 defined by the angled surface 42 is 85°, and the non-orthogonal angle between the axis 36 and the imaginary plane defined by the end surface of the antenna 34 is 85°. Alternately, the angled surface 42 of the boss 40 can be viewed as intersecting an imaginary plane defined by the top surface 32 of the radiotelephone body at a 5° angle. Accordingly, when rotated to the first position, the axis 36' defined by the antenna 34' (shown in dotted lines) is substantially parallel with the imaginary plane defined by the front face 24. In this position, the antenna can be more easily stored.

When rotated to the second position, the axis 36 defined by the antenna 34 (shown in solid lines) is canted 10° from the imaginary plane defined by the front face 24. As shown, this axis 36 intersects the front face 24 at a 10° angle. In this position, the antenna is positioned for operation of the radiotelephone so that electromagnetic shielding from the user's head is minimized.

As will be understood by those having skill in the art, the angle between the end surface of the antenna and the axis defined by the antenna, as well as the angle of the angled surface 42 of the boss 40 relative to the imaginary plane defined by the front face can be varied. Accordingly, the antenna can be designed to have a first position that is canted either toward or away from the imaginary plane defined by the front face. In addition, the antenna can be designed to have a second position that is canted either closer to or further from the imaginary plane defined by the front face.

The rotatable connection between the end surface of the antenna and the angled surface 42 of the boss 40 can be provided by a pin 50. As shown, this pin is solidly connected to the antenna and is movably mounted in the boss 40. Alternately, the pin can be solidly connected to the boss and movably mounted in the antenna, or movably mounted in both the boss and the antenna. In either case, the pin is coincident with the rotation axis 38 which intersects the angled surface 42 of the boss 40 at a 90° angle. The pin 50 may also be used to couple electromagnetic energy to and from the antenna 36. In addition, other conventional mountings which allow the antenna to move between first and second positions may be used as will be understood by those having skill in the art.

In the drawings and specification, there has been disclosed a typical preferred embodiment of the invention and, although specific terms are employed, they are used in a generic and descriptive sense only and not for purposes of limitation, the scope of the invention being set forth in the following claims.

That which is claimed:

1. A cellular radiotelephone comprising:

a radiotelephone body having a front face, said front face defining a first imaginary plane extending therefrom;

an antenna extending from said radiotelephone body and defining an axis, said antenna having a first end surface adjacent said radiotelephone body, said first end surface defining a second imaginary plane intersecting said axis at a non-orthogonal angle;

a boss on said radiotelephone body for receiving said first end surface of said antenna, said boss having an angled surface defining a third imaginary plane extending therefrom said third imaginary plane being parallel to said second imaginary plane, and intersecting said first imaginary plane at a non-orthogonal angle; and a pin rotatably connecting said first end surface to said angled surface, and forming an orthogonal angle with said first end surface and said angled surface.

2. A cellular radiotelephone according to claim 1 wherein said antenna extends from a top edge of said radiotelephone body.

3. A cellular radiotelephone according to claim 2 wherein said front face includes a speaker adjacent said top edge.

4. A cellular radiotelephone according to claim 1 wherein said antenna is on the order of 80 millimeters long.

5. A cellular radiotelephone comprising:

a radiotelephone body having a front face and a top edge, said front face defining an imaginary plane extending therefrom;

an antenna extending from said top edge of said radiotelephone body and defining a first axis, said antenna having a first end adjacent said top edge; and rotatable mounting means for rotatably mounting said antenna on said top edge of said radiotelephone body such that said antenna is rotatable about a second axis intersecting said first end between a first position wherein said first axis defines a first angular orientation relative to said imaginary plane, and a second position wherein said first axis defines a second angular orientation relative to said imaginary plane wherein said first axis is canted from said imaginary plane;

wherein said rotatable mounting means includes an angled surface on said radiotelephone body and an axis of rotation orthogonal to both said angled surface and said first end of said antenna.

6. A cellular radiotelephone according to claim 5 wherein said first angular orientation defines an arrangement of said antenna and said radiotelephone body such that said axis and said imaginary plane are substantially parallel.

7. A cellular radiotelephone according to claim 5 wherein said second angular orientation defines an arrangement of said antenna and said radiotelephone body such that said axis and said imaginary plane intersect at an acute angle.

8. A cellular radiotelephone according to claim 7 wherein said acute angle is on the order of 10 degrees.

9. A cellular radiotelephone according to claim 5 wherein said front face comprises a speaker adjacent said top edge.

10. A cellular radiotelephone according to claim 5 wherein said mounting means comprises a boss for receiving said first end of said antenna, said boss having a surface defining a second imaginary plane extending therefrom and intersecting said first imaginary plane, said first end of said antenna having an end surface defining a third imaginary plane intersecting said axis at a non-orthogonal angle, wherein said end surface is rotatably connected to said angled surface.

11. A cellular radiotelephone according to claim 10 wherein said mounting means comprises a pin for rotatably connecting said end surface to said angled surface.

12. A cellular radiotelephone according to claim 5 wherein said antenna is on the order of 80 millimeters long.

13. A cellular radiotelephone comprising:

a radiotelephone body having a front face and a top edge, said front face defining an imaginary plane extending therefrom;

an antenna extending from said top edge of said radiotelephone body and defining an axis, said antenna having a first end adjacent said top edge; and movable mounting means for movably mounting said antenna on said top edge such that said antenna is moveable between a first position wherein said axis defines a first angular orientation relative to said imaginary plane, and a second position wherein said axis defines a second angular orientation relative to said imaginary plane;

wherein said antenna rotates about a second axis intersecting said first end, said antenna rotating between said first position and said second position;

wherein said mounting means comprises a boss for receiving said first end of said antenna, said boss having an angled surface defining a second imaginary plane extending therefrom and intersecting said first imaginary plane at a non-orthogonal angle, said first end of said antenna having an end surface defining a third imaginary plane intersecting said axis at a non-orthogonal angle, said third imaginary plane being parallel to said second imaginary plane, wherein said end surface is rotatably connected to said angled surface; and wherein said second axis forms an orthogonal angle with said first end of said antenna and said angled surface of said boss.

14. A cellular radiotelephone according to claim 13 wherein said first angular orientation defines an arrangement of said antenna and said radiotelephone body such that said axis and said imaginary plane are substantially parallel.

15. A cellular radiotelephone according to claim 13 wherein said second angular orientation defines an arrangement of said antenna and said radiotelephone body such that said axis is canted from said imaginary plane.

16. A cellular radiotelephone according to claim 13 wherein said mounting means comprises a pin for rotatably connecting said end surface to said angled surface.

17. A cellular radiotelephone according to claim 13 wherein said acute angle is on the order of 10 degrees.

18. A cellular radiotelephone according to claim 13 wherein said antenna is on the order of 80 millimeters long.

19. A cellular radiotelephone according to claim 13 wherein said front face includes a speaker adjacent said top edge.

20. A cellular radiotelephone comprising:

a radiotelephone body having a edge, said edge defining an imaginary plane extending therefrom;

an antenna extending from said edge of said radiotelephone body and defining an axis, said antenna having a first end adjacent said edge; and movable mounting means for movably mounting said antenna on said edge such that said antenna is moveable between a first position wherein said axis defines a first angular orientation relative to said imaginary plane, and a second position wherein said axis defines a second angular orientation relative to said imaginary plane; and wherein said antenna rotates about a second axis intersecting said first end, said antenna rotating between said first position and said second position;

wherein said mounting means comprises a boss for receiving said first end of said antenna, said boss having an angled surface defining a second imaginary plane extending therefrom and intersecting said first imaginary plane at a non-orthogonal angle, said first end of said antenna having an end surface defining a third imaginary plane intersecting said axis at a non-orthogonal angle, said third imaginary plane being parallel to said second imaginary plane, wherein said end surface is rotatably connected to said angled surface; and wherein said second axis forms an orthogonal angle with said first end of said antenna and said angled surface of said boss.

21. A cellular radiotelephone according to claim 20 wherein said first angular orientation defines an arrangement of said antenna and said radiotelephone body such that said axis is substantially perpendicular to said imaginary plane.

22. A cellular radiotelephone according to claim 20 wherein said second angular orientation defines an arrangement of said antenna and said radiotelephone body such that said axis intersects said imaginary plane at a non-orthogonal angle.

23. A cellular radiotelephone according to claim 20 wherein said non-orthogonal angle is on the order of 80 degrees.

24. A cellular radiotelephone according to claim 20 wherein said mounting means comprises a pin for rotatably connecting said end surface to said angled surface.

25. A cellular radiotelephone according to claim 20 wherein said antenna is on the order of 80 millimeters long.

26. A cellular radiotelephone according to claim 20 wherein said edge is a top edge and said radiotelephone body comprises a front face including a speaker adjacent said top edge.

* * * * *